R. W. SAUNDERS.
SAFETY STEEL STRAP CUSHION LOCK.
APPLICATION FILED DEC. 5, 1921.
1,421,726.
Patented July 4, 1922.
2 SHEETS—SHEET 1.
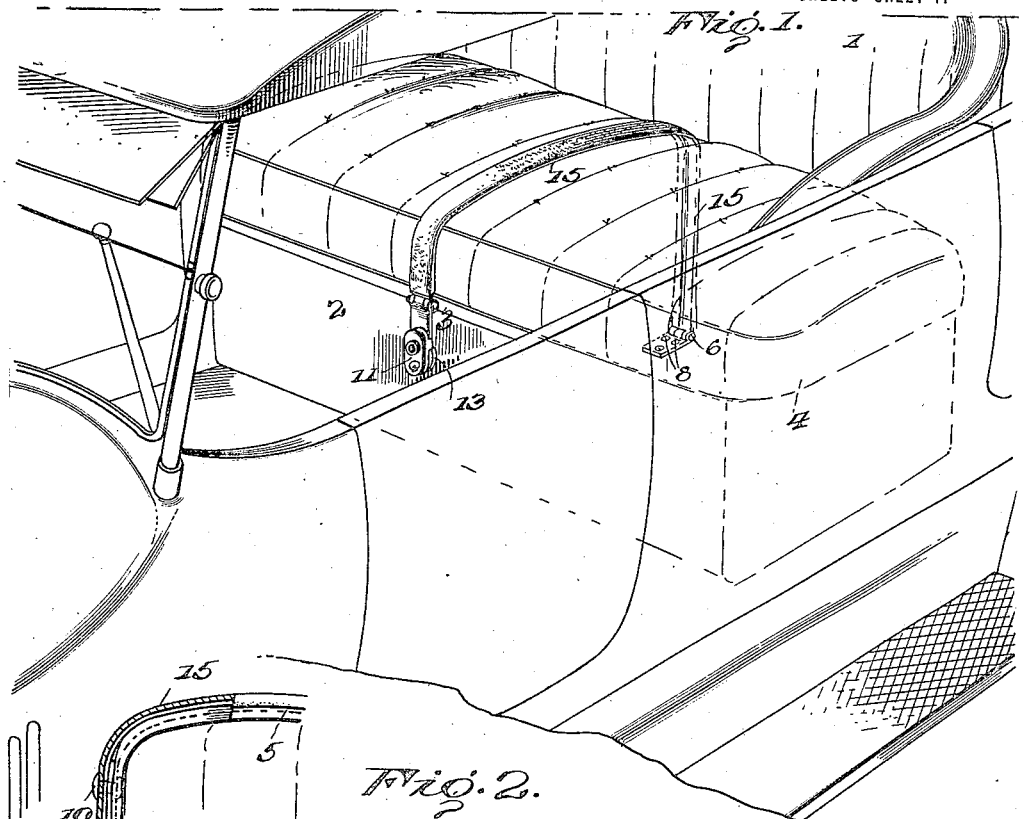
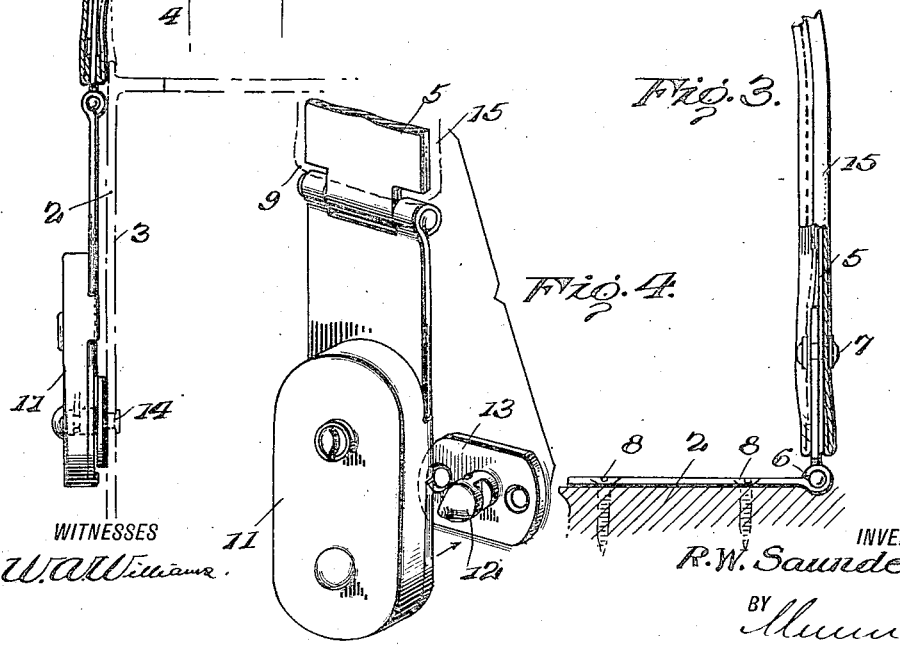
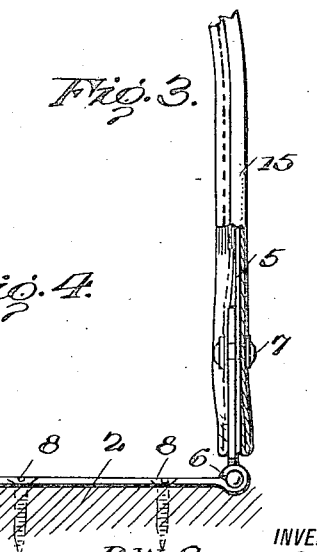
WITNESSES
W. A. Williams
INVENTOR
R. W. Saunders
BY
ATTORNEYS

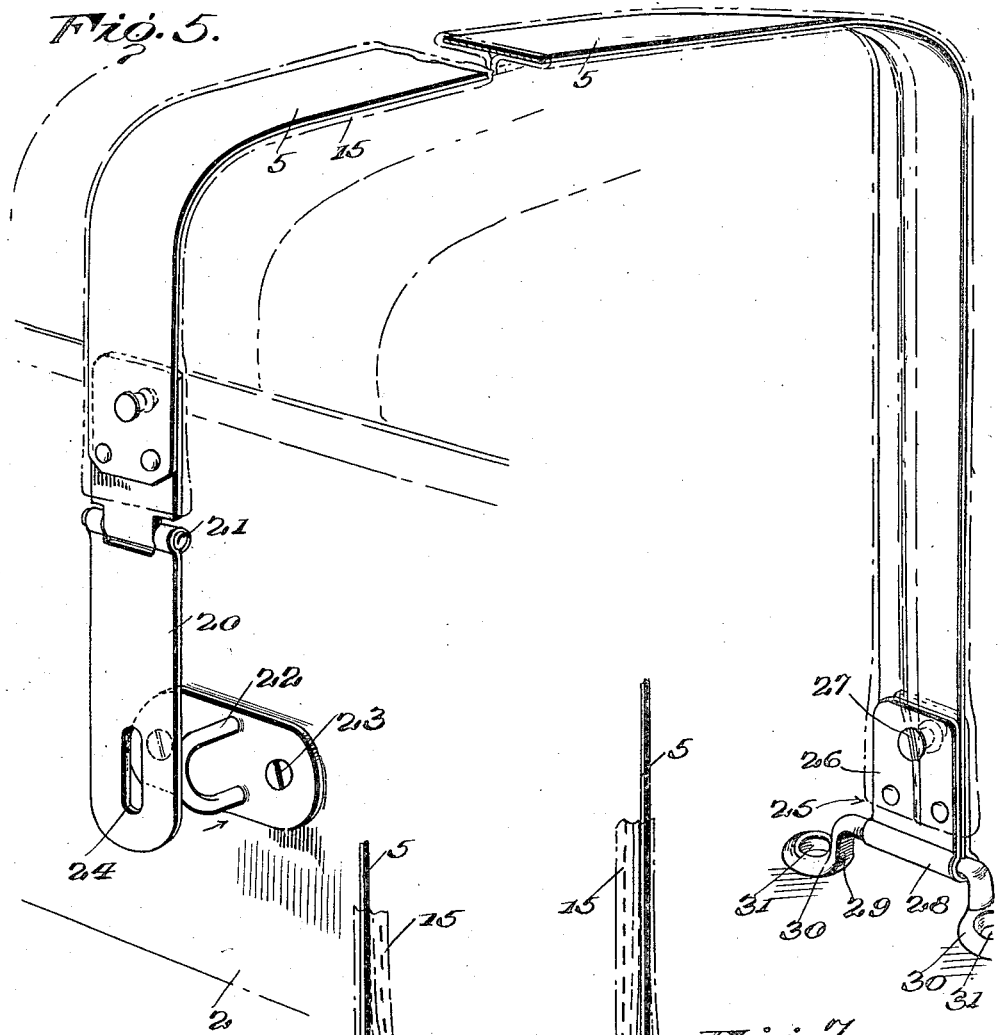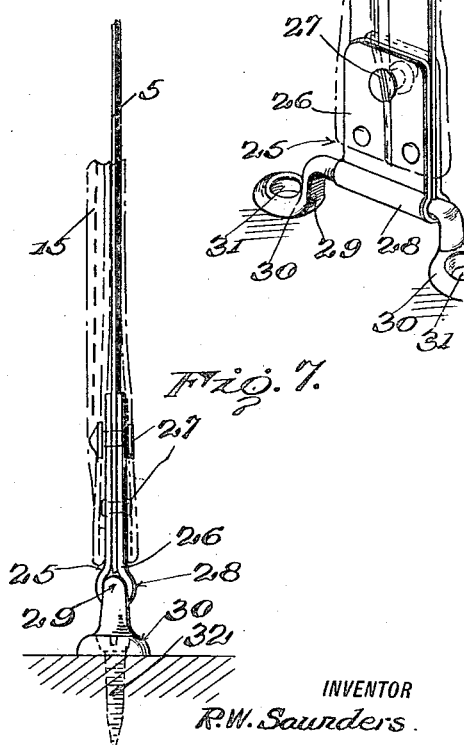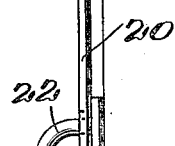

UNITED STATES PATENT OFFICE.

RANDALL WILLIAM SAUNDERS, OF BROOKLYN, NEW YORK.

SAFETY STEEL STRAP CUSHION LOCK.

1,421,726.  Specification of Letters Patent.  Patented July 4, 1922.

Application filed December 5, 1921. Serial No. 520,026.

*To all whom it may concern:*

Be it known that I, RANDALL WILLIAM SAUNDERS, a citizen of the United States, and resident of the city of New York, borough of Brooklyn, in the county of Kings and State of New York, have invented the Safety Steel Strap Cushion Lock Made for All Automobiles, the purpose of which is for locking the cushion seats to prevent theft of tools or other valuables.

The following is a full, clear, and exact description:

The invention relates to a locking device for all automobile cushions. The object of the invention therefore, is to provide a protection against thievery of tools and other valuables carried in the compartments under cushion seats.

With the foregoing, and other objects in view, the invention consists in the arrangement hereinafter described and claimed, and while the invention is not restricted to the exact details of construction disclosed herein, still, for the purpose of illustrating a practical embodiment thereof, reference is had to the accompanying drawings, in which like reference characters designate corresponding parts in all the views, and in which, Figure 1 is a respective view, showing the preferred embodiment of the invention operately applied to the seat of an automobile, Figure 2 is an enlarged edge view of a fragmentary portion of the structure shown in Figure 1, Figure 3 is a view similar to Figure 2 showing another portion of the structure exhibited in Figure 1, and Figure 4 is a detail perspective view, showing the locking element provided at one end of the preferred embodiment of the invention, Figure 5 is a perspective view, showing a modified form of the device operatively applied to an automobile seat, the latter being shown diagrammatically, and Figures 6 and 7 are edge views of opposite end portions of the modified form of the device.

Referring now particularly to Figures 1 to 4 inclusive, the numeral 1 indicates an automobile having a front seat including a supporting structure or body 2 formed to provide a compartment 3 open at its upper end and normally closed by means of a cushioned seat proper or lid 4. The lid or seat proper 4 is movable to permit access to the compartment 3 and tools, supplies and other small articles are ordinarily placed within the compartment 3 during a journey or stored therein. Considerable annoyance has been occasioned on account of the loss of articles placed within the compartments since unauthorized persons had only to lift the lid or seat proper 4 when unobserved to obtain the articles within the compartment. My invention provides means for normally holding the lid or seat proper 4 in position to close the compartment 3.

My invention in its preferred form comprises a longitudinal member 5, preferably a flat flexible band made of a suitable metal, such as spring steel. A hinge 6 has a leaf thereof fixedly secured to the flexible member 5 at one end of the latter, as by means of rivets 7 and is adapted to be secured, as by means of screws 8 or like fastening elements to a rear part of the body or supporting structure 2 of the seat. The longitudinal flexible member 5 is provided at its other end with a hinge 9 which has one leaf thereof fixedly attached thereto by means of rivets 10 and the free leaf of the hinge 9 carries a lock element 11 which is adapted to cooperate with a detent or shackle 12 carried by a plate 13 fixedly attached at 14 to the front part of the supporting structure 2, whereby the flexible member 5 may be maintained in position to hold the lid or seat proper 4 against displacement in respect to the supporting structure or body 2. The band 5 is covered with a fabric 15 which preferably conforms in texture, finish and appearance with the covering of the lid or seat proper 4.

In the modified form of the device illustrated in Figures 5 to 7, the band 5 has a hasp 20 pivotally attached to one end thereof as at 21. A staple 22 attached, as at 23 to the front part of the supporting structure or body 2 of the seat is insertable through a slot 24 of the hasp. A hinge 25 attached to the other end of the band 5 includes a hinge plate 26 fixedly attached, as by means of rivets 27 to the band 5 and being formed to provide a sleeve portion 28 in which is disposed the intermediate portion 29 of a cooperating hinge member having laterally turned end portions 30—30 enlarged and apertured at 31—31 to receive screws 32, or the like whereby the outer member of the hinge 25 may be attached to the rear part of the body 2. It is to be understood that the intermediate portion 29 of the outer member of the hinge 25 is rotatable in the sleeve portion 28.

The remaining parts of the modified form of the device are precisely identical with corresponding parts of the preferred form of the device and have been designated by the same numerals.

From the foregoing description of the various parts of the device, the operation thereof will be readily understood. When it is desired to remove the seat proper or lid 4, the fastening element provided by my invention is detached at the front end thereof from the supporting structure or body 2 of the seat. This may be done by operating the lock 11 of the preferred embodiment of the invention or by operating a padlock, not shown, or the like, which will be engaged with the staple 22 of the modified form of the device, after the latter has been inserted through the slot 24 of the hasp 20. It will thus be apparent that the seat proper or lid 4 will normally be maintained in closed position and the removal from the compartment 3 by unauthorized persons of articles placed therein effectively precluded.

Having thus described the invention, what I claim is:—

1. As an article of manufacture, a longitudinal substantially flat metal band, a hinge attached to the band at one end thereof, a lock element attached to the band at its other end and adapted to engage a co-operating lock element.

2. As an article of manufacture, a longitudinal substantially flat metal band, a hinge attached to the band at one end thereof, a lock element attached to the band at its other end, and adapted to engage a co-operating lock element, and a fabric covering for the band.

3. As an article of manufacture, a flexible longitudinal metallic member, a fabric covering therefor, and attaching means at the ends of the metallic member, for the purpose set forth.

4. As an article of manufacture, a longitudinal substantially flat metal band, means for flexibly attaching the band at one end to a support, and a lock element attached to the band at its other end and adapted to engage a cooperating lock element.

5. As an article of manufacture, a flexible longitudinal metallic member, means for flexibly attaching the metallic member at one end to a support, and a lock element attached to the metallic member at its other end and adapted to engage a cooperating lock element.

RANDALL WILLIAM SAUNDERS.